United States Patent [19]
Williamson et al.

[11] Patent Number: 5,814,966
[45] Date of Patent: Sep. 29, 1998

[54] DIGITAL POWER OPTIMIZATION SYSTEM FOR AC INDUCTION MOTORS

[75] Inventors: David L. Williamson; Ryan Corley, both of Austin, Tex.

[73] Assignee: National Power Systems, Inc., Miami, Fla.

[21] Appl. No.: 598,614

[22] Filed: Feb. 12, 1996

Related U.S. Application Data

[63] Continuation-in-part of Ser. No. 287,129, Aug. 8, 1994, abandoned.

[51] Int. Cl.$^6$ .................................................. H02P 5/98
[52] U.S. Cl. .......................... 318/798; 318/787; 318/812
[58] Field of Search ...................................... 318/727–832

[56] References Cited

U.S. PATENT DOCUMENTS

| | | | |
|---|---|---|---|
| 511,374 | 5/1992 | Lai et al. | 318/811 |
| 4,052,648 | 10/1977 | Noks . | |
| 4,088,935 | 5/1978 | D'Atre et al. . | |
| 4,099,107 | 7/1978 | Eder . | |
| 4,176,307 | 11/1979 | Parker . | |
| 4,190,793 | 2/1980 | Parker et al. . | |
| 4,207,510 | 6/1980 | Woodbury . | |
| 4,242,625 | 12/1980 | Hedges . | |
| 4,243,927 | 1/1981 | D'Atre . | |
| 4,276,505 | 6/1981 | Bose . | |
| 4,281,276 | 7/1981 | Cutler et al. . | |
| 4,297,628 | 10/1981 | Hedges . | |
| 4,314,190 | 2/1982 | Walker et al. . | |
| 4,382,223 | 5/1983 | Hegdes . | |
| 4,414,499 | 11/1983 | Hedges . | |
| 4,450,398 | 5/1984 | Bose . | |
| 4,636,702 | 1/1987 | Hedges . | |
| 4,833,628 | 5/1989 | Curran, Jr. | 318/729 |
| 4,864,212 | 9/1989 | Parker . | |
| 4,912,390 | 3/1990 | Curran, Jr. et al. | 318/812 |
| 5,471,127 | 11/1995 | Vaughan et al. | 318/809 |
| 5,552,685 | 9/1996 | Young et al. | 318/801 |

*Primary Examiner*—David S. Martin
*Attorney, Agent, or Firm*—Thompson & Knight, P.C.

[57] ABSTRACT

A method and apparatus are disclosed for improving the efficiency of operation of AC induction motors. The method and apparatus utilizes a microprocessor to tune a motor control system such that the time interval between the turn-on of a bi-directional switch and the time of sensing the resultant inrush current through the stator is maintained substantially constant as the load is varied.

6 Claims, 7 Drawing Sheets

TRIAC FIRING ANGLE

DIGITAL POWER OPTIMIZATION SYSTEM FOR AC INDUCTION MOTORS

CROSS-REFERENCE TO A RELATED APPLICATION

This is a continuation-in-part of application Ser. No. 08/287,129, filed Aug. 8, 1994, now abandoned, entitled "Digital Power Optimization System for AC Induction Motors."

BACKGROUND OF THE INVENTION

Alternating current (AC) induction motors are designed for optimum efficiency operation at full rated load and specified voltage. Operating efficiency losses are due to the resistance of the windings through which the current flows or copper losses as well as hysteresis losses or iron losses, all resulting in the inherent inefficiency of the conversion of electric energy into magnetic field energy. The induction motor is inefficient when it is used at less than full load or at less than its minimum specified voltage or any combination of the two. The stator windings have the full voltage applied at all times irrespective of load with the result that both the resultant copper and iron losses are large even when the load is small. This results in excessive heating of the motor, shortened life and increased maintenance and operating costs. Increased heating causes a further increase of resistance, thus further decreasing efficiency.

One of the ways of reducing losses when operating an AC induction motor at less than full load is to reduce the applied voltage below its specified minimum. A known method used to accomplish this is to interrupt the AC power source for part of each cycle. The motor under less than full load will continue to run at its normal speed due to its rotational momentum even though each half cycle of power applied is less than a full half cycle. A common device used to interrupt the AC power source is a bi-directional silicon controlled rectifier switch such as a Triac installed in series with the stator windings. The Triac is turned on by an electrical signal for varying amounts of the AC power cycle and can be switched in either direction. The effective applied voltage is thus reduced, which results in a reduction of stator current.

Although the adjustment of the stator current to match varying motor loads appears straightforward in theory, it is a difficult matter in practice, particularly when attempting to optimize the efficiency of a motor whose load is varying over time.

The usual approach is to sense the load on the motor and to cause a voltage or signal to be produced which varies with the load. The load sensitive signal is then used to vary the duration during each AC cycle that the Triac is on. In this manner when the motor load is heavy, the signal will keep the Triac on for most of the AC cycle and more power will be delivered to the motor stator resulting in additional torque, while as the load decreases, the signal will be such as to reduce the duration of time the Triac is on and thus resulting in less power to the motor. Since there is no current to the stator during part of the low load AC cycle, heat and hysteresis losses are reduced, improving the overall efficiency of the motor.

Such methods for improving the operating efficiency of AC induction motors have been described in previous patents (e.g., Parker U.S. Pat. No. 4,864,212, Hedges U.S. Pat. No. 4,636,702, and Fisher U.S. Pat. No. 5,200,684).

The previous methods describe means for controlling the current flow through the motor to achieve improvements in either speed control or load control, by measuring parameters such as the back EMF or the phase lag between the voltage and current zero crossings.

These methods are designed for particular conditions of load and motor parameters and are not readily adaptable to continuously varying loads. The present invention is an improvement as it relates to apparatus and a method for automatically tuning the motor to obtain improved efficiency from AC induction motors under varying load and other operating conditions.

Improved efficiency is achieved when the stator current is equal to the rotor current under idealized conditions. All motor control systems are efforts to reach or achieve such a condition, or given certain external parameters to approach such an operating state for most of the conditions of a motor.

Even motors that operate with steady-state loads have at least three different operating conditions. There is the initial startup, when inrush current can be very large, there is the period during the normal heating of the motor while it achieves its stabilized temperature, and finally there is the steady-state operation. Designing or adjusting for optimum efficiency at any one condition compromises efficiency at other conditions. Furthermore, motors must be capable of operating in real environments, where the input voltage usually varies (e.g., possibility of low or brown-out conditions, as well as high voltages or voltage surges). Ambient temperatures may also vary over wide ranges. Most of all, the load may vary because of the aforementioned external parameters, as well as the nature of the equipment the motor is required to operate. The problem then is to improve efficiency under all varying conditions of load, in real time, as well as under the various conditions of motor operation (e.g., start-up, steady-state, constant load, varying load and intermittent operation and shut-down.

Since motors present an inductive load, there will be a lag or phase delay between the applied AC voltage and the current in the stator winding. In some existing systems, the phase angle between the zero voltage crossing and the zero current crossing is measured to estimate the load conditions in real time and to adjust the Triac firing angle accordingly. Other systems measure the back EMF and use this parameter to improve efficiency of operation. Existing systems utilize manual adjustments, as well as, microprocessors, to measure the above parameters and adjust the Triac firing times. Although these methods achieve improvement in efficiency over uncontrolled motors, none has the advantage of a real time continuing automated efficiency optimization of the present invention.

SUMMARY OF THE INVENTION

In accordance with the present invention, there is provided a method and apparatus for automatically adjusting the firing angle of a Triac controlled AC induction motor to improve efficiency over a wide range of variable loads.

In accordance with the present invention, there is provided a method and apparatus for automatically adjusting the firing angle of a Triac controlled AC induction motor to improve efficiency over a wide range of variable loads.

The present invention includes an induction motor in series with a Triac and an inrush current sensing device, all in series with the AC power source. The Triac is regulated or controlled by a microprocessor programmed to turn the Triac on and off for improved efficiency under varying conditions. The introduction of a digital control system (a microprocessor), together with embedded software, allows for automatic improvement of the efficiency of operation under variations of load and power input.

The present invention uses an improved method of maintaining operation of the motor at a high level of efficiency, by measuring parameters not previously considered. By measuring these parameters and using the information to set the Triac turn-on delay, an improved efficiency of operation results. A further advantage is that by measuring these different parameters, the system is continually tuned or adjusted to maintain optimum efficiency of the motor in real time, through variations of motor load, input voltage and other operating conditions.

The invention utilizes a saturable transformer in series with the motor stator and a Triac connected to the AC voltage source. The output of the saturable transformer produces a narrow voltage spike corresponding to the inrush current following the turn-on of the Triac. A microprocessor responds to a measurement of the voltage spike amplitude for each half cycle and compares the amplitude of the measured voltage spike with prior measured amplitudes. As the Triac turn-on delay increases for each half cycle, the voltage spike will be of a constant amplitude, as the delay increases further the amplitude of the voltage spike increases, then decreases and increases again. The system of the present invention searches for a decrease in spike amplitude as a function of increasing Triac turn-on delay. The non-linearity of these parameters as a function of Triac turn-on delay time gives rise to the ability of automatic tuning of the system to operate in an area where the spike amplitude decrease slope is of a magnitude which corresponds to optimum efficiency of motor operation.

In operation, when the microprocessor senses that the motor is operating at optimum efficiency the time interval between the turn-on of the Triac and the voltage spike representing the inrush current for the optimal efficiency conditions is measured and stored in memory. Once this time interval is established, maintaining the time interval constant or nearly so will assure optimally efficient operation as the load varies. The time interval is inversely proportional to the load, thus as the time interval decreases (e.g., when the load increases), this variation will be sensed and the Triac turn-on delay will be reduced. By reducing the Triac turn-on delay, the time interval will increase regaining efficient operation. The control is maintained by a microprocessor with built-in memory. The memory stores the instruction for performing the measurements, comparing them to the prior data and adjusting the Triac firing delay. An external clock is utilized for timing measurements.

In addition, this invention provides for a shut-down under brown-out or low voltage conditions, as well as over voltage conditions, thus minimizing possible damage to the motor.

BRIEF DESCRIPTION OF THE DRAWINGS

Other aspects, objects and advantages of the present invention will become apparent to those skilled in the art, having had the benefit of the following disclosure and the accompanying drawings.

DETAILED DESCRIPTION

Figure 1:
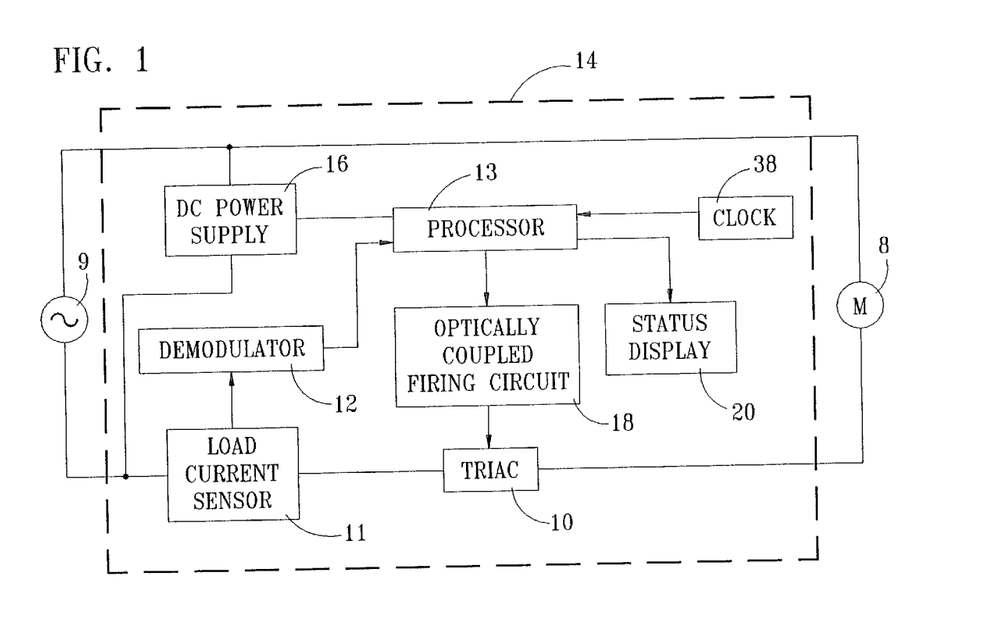
FIG. 1 is a block diagram of a control system in accordance with the present invention.

Referring now to FIG. 1, an AC induction motor 8 is connected in series with a full wave switch (Triac) 10 to limit the voltage applied across the stator of the motor 8 and to also limit the current through the stator. A saturable core transformer 11 (load current sensor) is also connected in series with the stator of the induction motor 8. The output of the transformer 11 is a measure of the peak inrush current through the stator.

When an AC voltage from the source 9 is applied to the stator of the motor 8, while the full wave switch 10, such as a Triac, is on, a delayed current will flow due to the inductive reactance of the circuit. The actual delay is proportional to the resistance of the stator, the motor characteristics and a load coupled to the motor. During the greatest rate of change of current as a function of time, which occurs during the leading edge of the inrush current waveform, a voltage pulse or spike will be produced on the output of the saturable core transformer 11.

Induction motors are typically equipped with starter windings to enhance the initial start or rotation of the motor. In accordance with the present invention, the motor 8 is monitored as it goes through its "starting mode" to start controlling functions following the start mode. Induction motors are designed to switch out of the starting mode automatically. The control system 14 responds to the presence of large voltage pulses, representing the inrush current, at the output of the saturable core transformer 11. When the start mode ends, as it is normally designed to do automatically, the voltage pulses would decrease below a limiting voltage level and the control system 14 senses that the motor 8 has entered its operating mode. If the motor starting mode fails to automatically end after a pre-programmed length of time, usually a few seconds, but variable for different motors, the control system 14 will assume a locked rotor condition exists and it will shut down the motor 8, requiring a manual restart.

Figure 2:
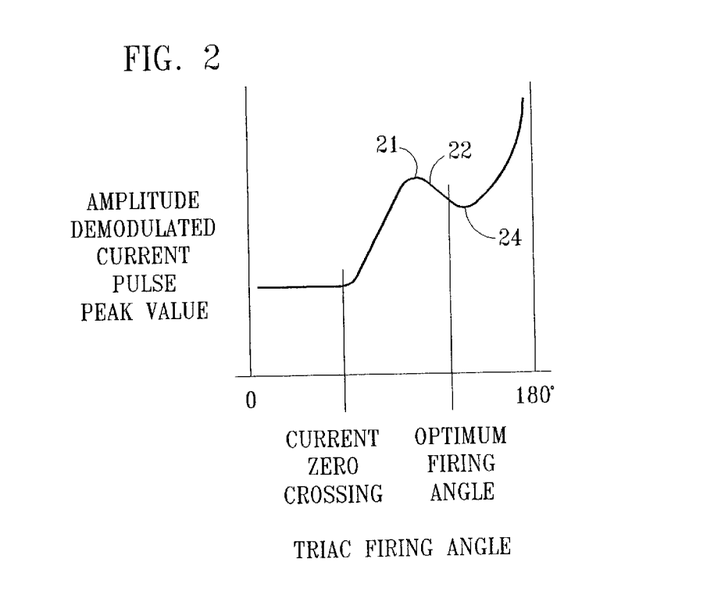
FIG. 2 is a plot of amplitude vs. firing angle, showing the negative slope of the peak amplitude demodulated inrush current pulse as a function of Triac firing angle.

Assuming that the motor 8 is past its starting mode, on a subsequent voltage cycle, the Triac 10 will be turned on after an arbitrary delay of approximately 400 μsec. This is the time interval between the line voltage zero crossing from a source 9 and the turn-on of the Triac 10. At a later time within that voltage cycle, depending on the characteristics of the circuit, a current will flow which produces a voltage spike or pulse at the output of the saturable transformer 11. The control system 14 then advances to what is referred to as the "capture mode". On the subsequent half cycle of the input voltage, the microprocessor 13 controls the turn-on of the Triac 10 to be delayed by an additional 25 μsec., and the voltage pulse from the saturable transformer 11 representing the inrush current will be again measured. The amplitude of the last pulses from the saturable transformer 11 are compared with the previously generated pulses. When the amplitude of the last pulse starts increasing, illustrating that the stator and rotor currents of the motor 8 are close to equal and motor efficiency is nearing its optimum, the microprocessor 13 transfers from the capture mode and initiates a "tune mode". On subsequent voltage half cycles of the input voltage from the input source 9, the turn-on delay of the Triac 10 will be increased by 1 μsec. increments and the amplitude of the resulting pulse from the saturable transformer 11 representing the inrush current will again be measured. The amplitude of the inrush current pulses will peak at some value as additional delays are introduced, but will subsequently decrease if still additional delays are introduced and eventually resume increasing as yet additional delays are introduced. The optimum operation of the motor 8 is realized on the down slope of a plot of amplitude vs. Triac firing angle, as illustrated in FIG. 2, after reaching the initial peak amplitude.

The microprocessor 13 is programmed to sense the reversal in slope, from increasing amplitude pulses to decreasing amplitude pulses, and will stop the additional of delay increments to the time interval between zero voltage crossing and the turn-on of the Triac 10. The control system 14 continues to respond to the time interval between the turn-on of the Triac 10 and the zero crossing of the voltage representing the inrush current. This time interval is stored in the memory of the microprocessor 13, and the control system 14 now shifts to an "operating mode" to maintain this latter time interval. This operating mode interval will be unique for a given motor under selected operating conditions.

As the load increases and more current is required, the control system 14 attempts to maintain the interval by turning the Triac 10 on earlier, as measured from the zero voltage crossing. As the load decreases and less current is required, the control system 14 will maintain the stored time interval by turning the Triac 10 on later, as measured from the zero voltage crossing.

If the rate of change of load or current required is too fast for the control system 14, then the microprocessor 13 causes an error flag to be generated and the control system 14 goes through a "re-start mode". Capture, tune and maintenance modes are repeated. The control system 14 will thus automatically seek and locate the optimally efficient point of operation and then maintain such operation as changes in load or input voltage occur.

The advantages of the system are the reduced power consumption and the resultant reduced operating temperature of the motor 8, resulting in further incremental improvements in efficiency, or conversely in the ability to obtain greater power output from smaller motors.

The control circuitry is further described as follows. The output of the saturable transformer 11 is demodulated and rectified by a demodulator 12 and results in voltage pulses proportional to the inrush current through the stator of the motor 8. A microprocessor 13, controlled by a clock 38 and receiving the output of the demodulator 12, is programmed to respond to the amplitude of the voltage pulses representing the inrush current as a function of the time interval between the zero voltage crossing of each half cycle of the input line voltage from the source 9 and the Triac 10 turn-on time. The characteristics of the control system 14 are such that when the ratio of the demodulated pulse amplitude is plotted against the firing angle of the Triac 10, a curve containing an intermediate peak 21 and a null point 24 occurs, as shown in FIG. 2. The down slope 22 approaching the null point 24 represents the optimum firing angle for the Triac 10, as a function of AC induction motor load, at which point the applied stator current and induced rotor current are matched. It is important to note that the control system 14 in searching for the optimum delay in turning on the Triac 10 must change from increments in the order of 25 μsec. to those of only 1 μsec. as the point of optimum operation if approached.

This invention makes use of the anomaly in the ratio of modulated current amplitude and Triac firing angle to automatically locate and select the null point and maintain the firing angle on the negative slope of the curve approaching the null point. In this manner, optimum efficiency is maintained.

Also included as a part of the control system 14 is a DC power supply 16 connected to the voltage source 9 and providing a DC voltage for the microprocessor 13. In addition, the microprocessor 13 is connected to a status display 20 for providing a visual presentation of the operation of the control system 14. To control the firing angle of the Triac 10, an optically coupled firing circuit 18 responds to an output of the microprocessor 13 and provides the control signals to the Triac.

Figure 3:
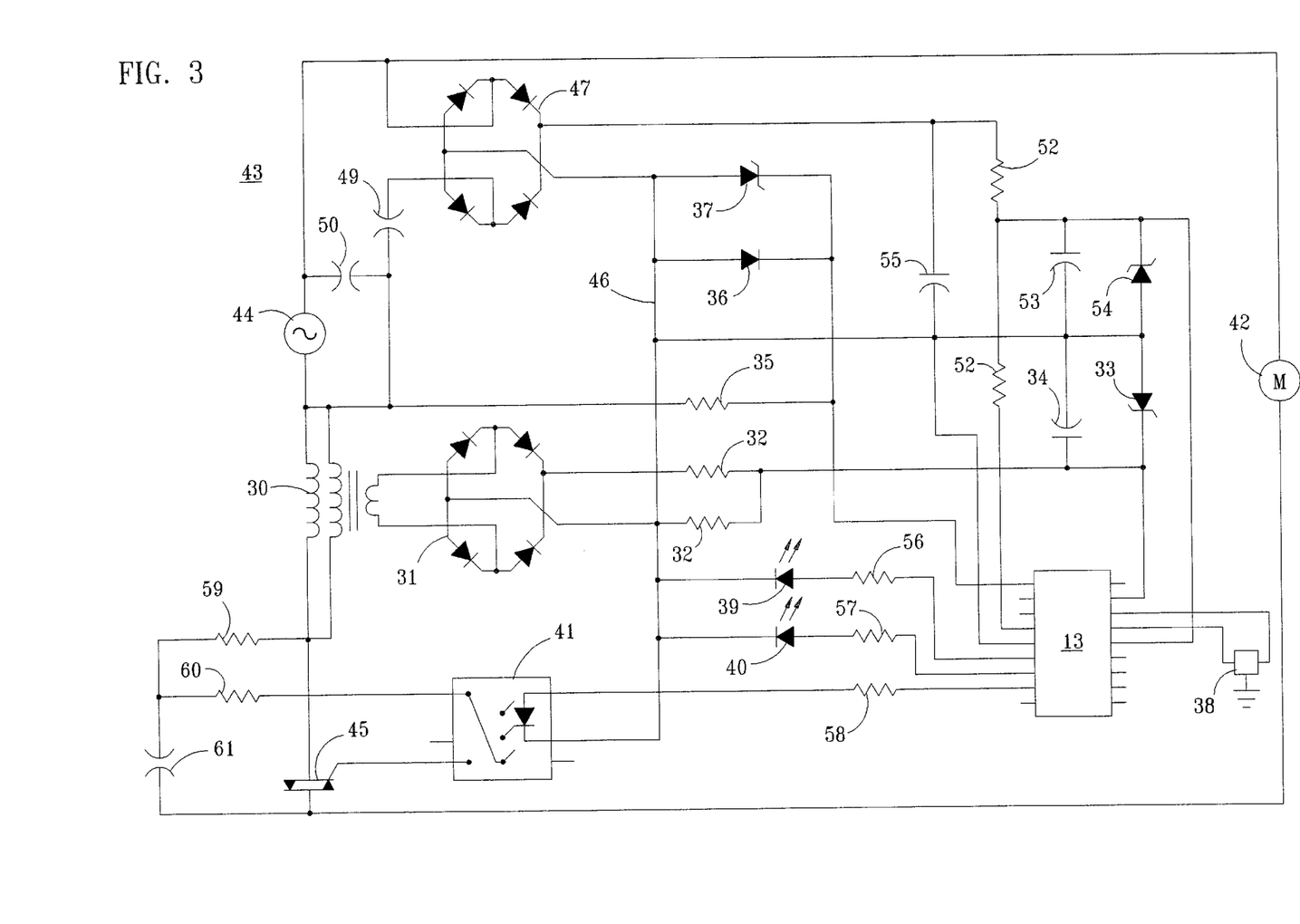
FIG. 3 is a detailed circuit diagram of the control system of FIG. 1.

Referring now to FIG. 3, there is shown a schematic of a control system 43 for optimally controlling the operation of a motor 42 coupled to an input voltage supply 44. One terminal of the motor 42 connects directly to the supply 44 while the second terminal of the motor connects to the voltage supply through a saturable transformer 30 and a Triac 45. Voltage pulses output from the saturable transformer 30 represent the inrush current to the motor 42 and are demodulated by a full wave diode bridge 31 having an output load comprising a divider network of resistors 32. The common interconnection between the resistors 32 is connected to a zener diode 33 and a capacitor 34 that further limits and filters the output of the full wave diode bridge 31. The resulting limited and filtered voltage pulse output is applied to an analog-to-digital converter as part of the microprocessor 13.

Also connected to the voltage supply 44 is a current limiting resistor 35 having one terminal connected to a diode 36 and a zener diode 37. The diode 36 shunts the negative excursions of the input wave form to a common bus 46 while the zener diode 37 clamps the positive excursions of the input wave form to approximately five volts. The resulting waveform at the interconnection of the resistor 35, the diode 36 and the zener diode 37 is a square wave applied to the microprocessor 13 to determine zero voltage crossings and as a reference for timing measurements.

The various DC voltages for operation of the microprocessor 13 are generated by a diode bridge 47 having one terminal connected directly to the voltage supply 44 and a second terminal connected to the voltage supply 44 through a filter capacitor 49. Also connected to the capacitor 49 and a terminal of the voltage supply 44 is a filter capacitor 50.

Connected to the positive terminal of the diode bridge 47 is a divider network of resistors 52 having a common interconnection connected to a filter capacitor 53, a limiting zener diode 54 and a supply terminal of the microprocessor 13. The common line 46 also connects to a supply terminal of the microprocessor 13. Interconnected between the positive terminal of the diode bridge 47 and the common line 46 is a filter capacitor 55.

To clock the various functional operations of the microprocessor 13, the crystal control clock 38 has two output lines connected to terminals of the microprocessor.

The status of the control system 44 is indicated by a display comprising light emitting diodes 39 and 40 interconnected to the microprocessor 13 by means of resistors 56 and 57, respectively.

Control signals generated by the microprocessor 13 are applied through resistor 58 to an optically coupled firing circuit 41 that provides turn-on pulses to the Triac 45. Also connected to the firing circuit 41 is one terminal of the saturable transformer 30 through resistors 59 and 60. The interconnection of these two resistors is also tied to a filter capacitor 61.

Figure 4:
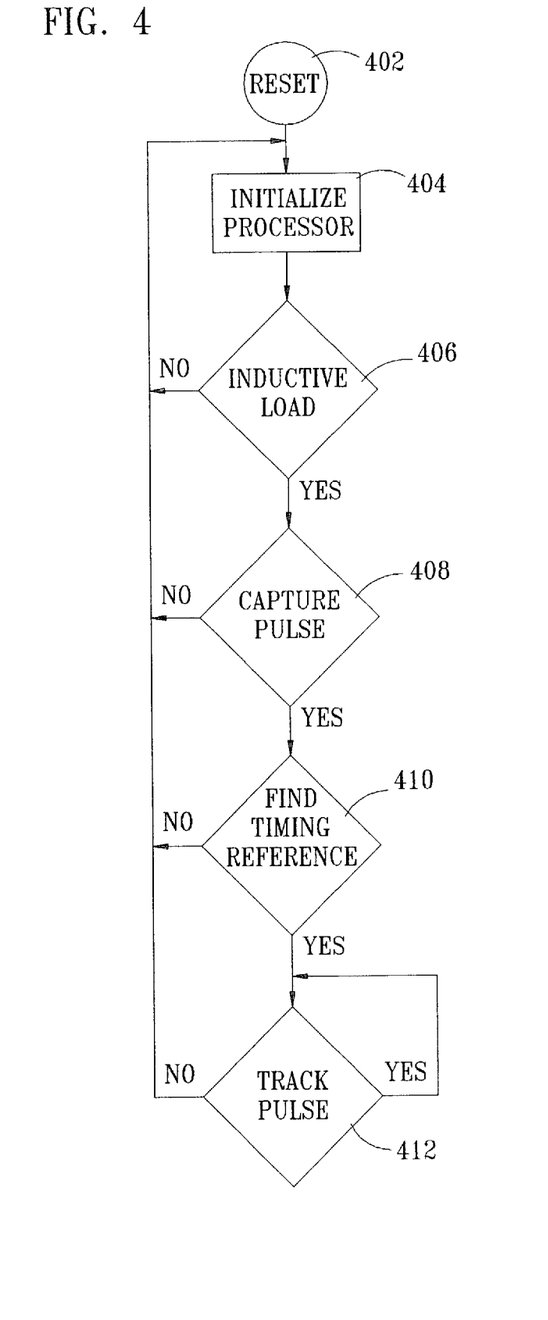
FIG. 4 is a flowchart illustrating the operation of a microprocessor as part of the control system of FIG. 1.

Referring now to FIGS. 4–8, the operation of the microprocessor 13 to control the turn-on of the Triac 45 is illustrated by way of flow charts. With reference to FIG. 4, the microprocessor 13 is reset at step 402 to start the process of controlling the optimum operation of the motor 42. After resetting the microprocessor 13, a processor initializing routine 404 is run to place the microprocessor in condition for generating control pulses to the firing circuit 41. After initializing the microprocessor 13, an inductive load check is made during inquiry step 406 to determine if the load connected to the control system 43 is inductive. A non-inductive load causes the microprocessor 13 to recycle back to the initializing routine 404. An inductive load identified at the inquiry 406 advances the microprocessor 13 to a capture pulse inquiry 408, which analyzes if a pulse is available to capture for processing in accordance with the previous description. If no pulse is available for capture, the microprocessor 13 recycles back to the initializing routine 404. When the capture pulse inquiry 408 identifies a pulse then the microprocessor 13 advances to a timing reference inquiry 410. If no timing reference is identified by the inquiry 410, the microprocessor 13 recycles back to the initializing routine 404. Identification of a timing reference advances the microprocessor 13 to a pulse inquiry 412. When the microprocessor 13 cannot track a pulse, the operation thereof returns to the initializing routine 404. Identification of a pulse available for tracking causes the microprocessor 13 to recycle through the pulse inquiry 412.

Figure 5:
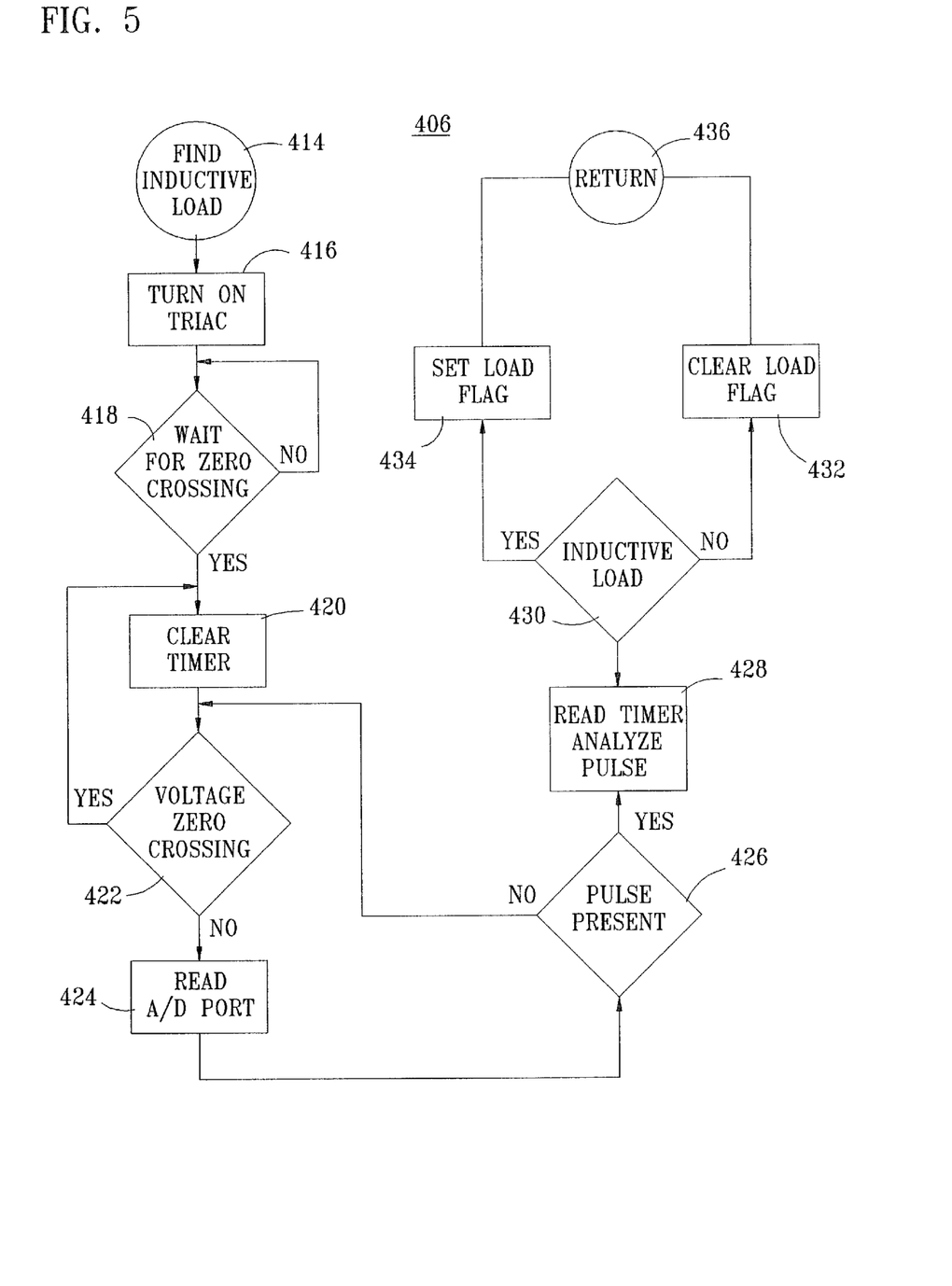
FIG. 5 is a flow diagram illustrating details of the inductive load sequence illustrated in FIG. 4.

Referring to FIG. 5, there is shown a flowchart of the inductive load inquiry 406. Upon the identification of an inductive load connected to the control system 43, inquiry 406 is entered at a step 414. Initially, the microprocessor 13 turns on the Triac 45 through the firing circuit 41 during operation of a turn-on routine 416. Following running of the turn-on routine 416, a zero crossing inquiry 418 is made to determine the presence of a voltage zero crossing. The zero crossing inquiry 418 recycles until the microprocessor 13 identifies a voltage zero crossing and the inductive load inquiry 406 then advances to a clear timer routine 420 to clear internal timers of the microprocessor 13. After the timers have been cleared, a zero voltage inquiry 422 is made to again identify a voltage zero crossing. The inductive load inquiry 406 recycles through the clear time routine 420 until the zero voltage inquiry 422 identifies that there is no voltage zero crossing. This negative result of the zero voltage inquiry 422 advances the load inquiry 406 to a read routine 424 that responds to the output of the internal analog-to-digital converter within the microprocessor 13. With the information read from the analog-to-digital converter at a data port, the load inquiry 406 advances to a pulse present inquiry 426 to identify the presence of a pulse. If no pulse is identified by the pulse present inquiry 426, the routine of FIG. 5 recycles back to zero voltage inquiry 422. The routine continues to recycle until a pulse is present, as determined by the pulse present inquiry 426 which advances the inductive load inquiry 406 to a timer routine 428 that analyzes the pulse identified by the pulse present inquiry 426. Following completion of the timer routine 428, the inductive load inquiry 406 advances to a load inquiry 430 that analyzes if an inductive load is connected to the control system 43. When no inductive load is identified by the load inquiry 430, the load inquiry 406 advances through a clear flag routine 432 to clear the load flags of the microprocessor 13. When an inductive load is identified at the load inquiry 430, a load flag routine 434 is run to set load flags within the microprocessor 13 to advance the operation of the microprocessor to the capture pulse inquiry 408, as shown in FIG. 4. Following the running of the clear flag routine 432 or the load flag routine 434, the load inquiry 406 returns through sequence 436 to a standby ready state.

Figure 6:
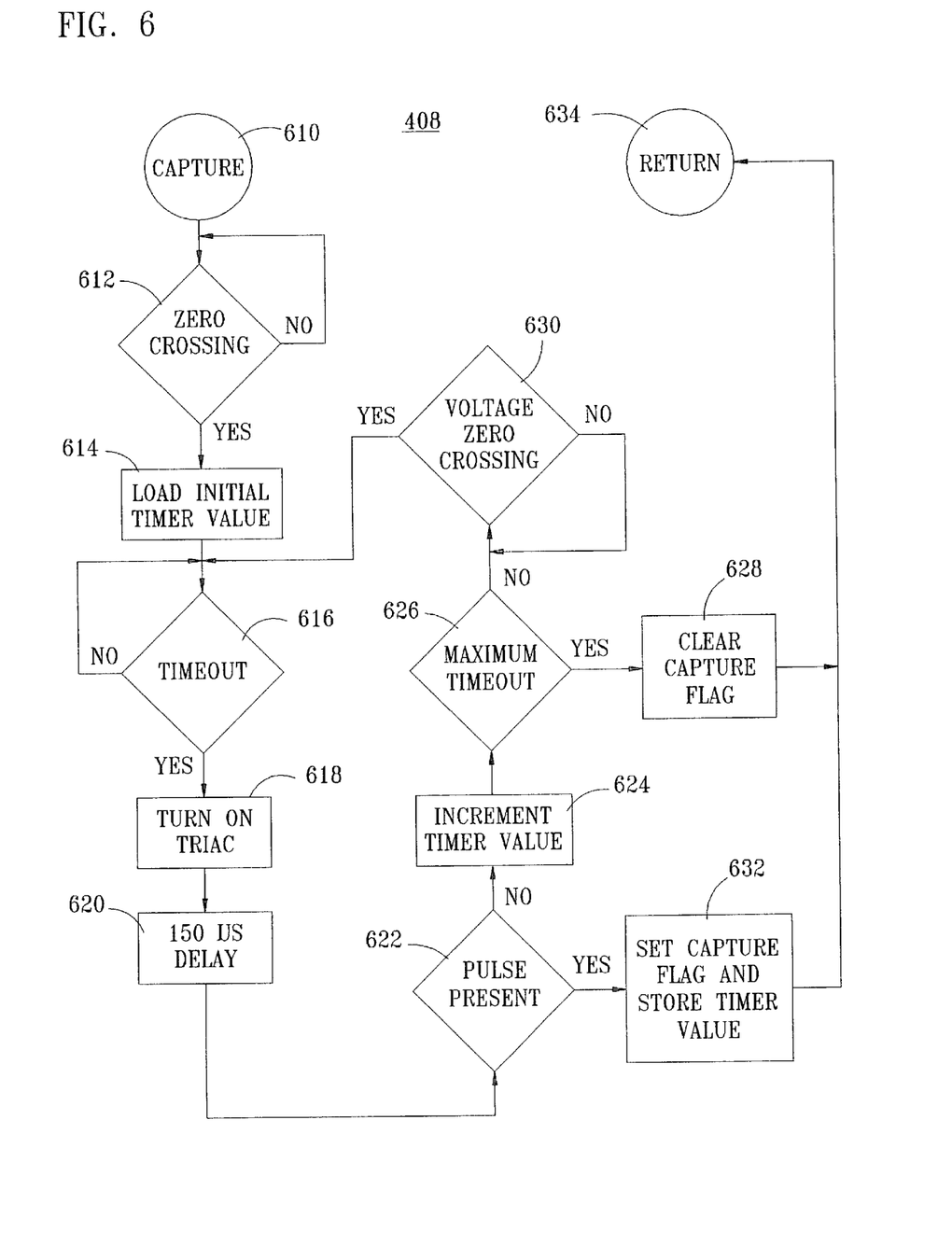
FIG. 6 is a flow chart illustrating in detail the capture pulse routine of FIG. 4.

Referring now to FIG. 6, there is illustrated details of the capture pulse routine 408 of FIG. 4. Following identification of an inductive load during the load inquiry 406, the capture pulse routine 408 is entered at a step 610 to cause the microprocessor 13 to advance to a zero crossing inquiry 612. The zero crossing inquiry 612 recycles until a zero crossing is identified, thereby causing the microprocessor 13 to advance to a load timer value routine 614. During running of the load routine 614, initial timer values are set within the microprocessor 13. Upon completion of the routine for setting the timer values, the capture pulse routine 408 advances to a time-out inquiry 616 which recycles until a time-out value has been reached. When the time-out inquiry 616 identifies the occurrence of a time-out, the capture pulse routine 408 advances to a Triac routine 618 that turns on the Triac 45 through the firing circuit 41. Upon completion of the Triac routine 618, the microprocessor 13 advances to a delay routine 620 that causes the microprocessor to generate a delay between subsequent firings of the Triac 45. The delay routine 620 generates a 150 microsecond delay between subsequent firings of the Triac 45 and upon completion of this routine, the capture pulse routine 408 advances to a pulse inquiry 622 to determine the presence of a pulse at the output of the saturable transformer 30. If no pulse is identified, the capture pulse routine 408 advances to an increment timer routine 624 that increments the initial time value set by the timer value routine 614. Following the timer routine 624, the microprocessor 13 advances to a time-out inquiry 626 that evaluates for a maximum time-out condition. Upon the occurrence of the maximum time-out interval, the microprocessor 13 advances to a clear sequence 628 that clears a capture flag that may have been previously set. If the maximum time-out has not occurred at the time-out inquiry 626, the capture pulse routine 408 advances to a zero crossing inquiry 630 to evaluate if a voltage zero crossing has occurred. The zero crossing inquiry 630 recycles until a voltage zero crossing has been identified; at that time, the microprocessor 13 returns to the time-out inquiry 616.

Returning to the pulse inquiry 622, with the identification of a pulse present in the microprocessor 13, the capture flag routine 408 advances to a capture routine 632 that sets a capture flag and stores the timer value representing the time between subsequent pulses at the output of the Triac 45. Upon completion of either the clear flag routine 628 or the capture routine 632, the capture flag routine 408 returns to a ready state through a step 634.

Figure 7:
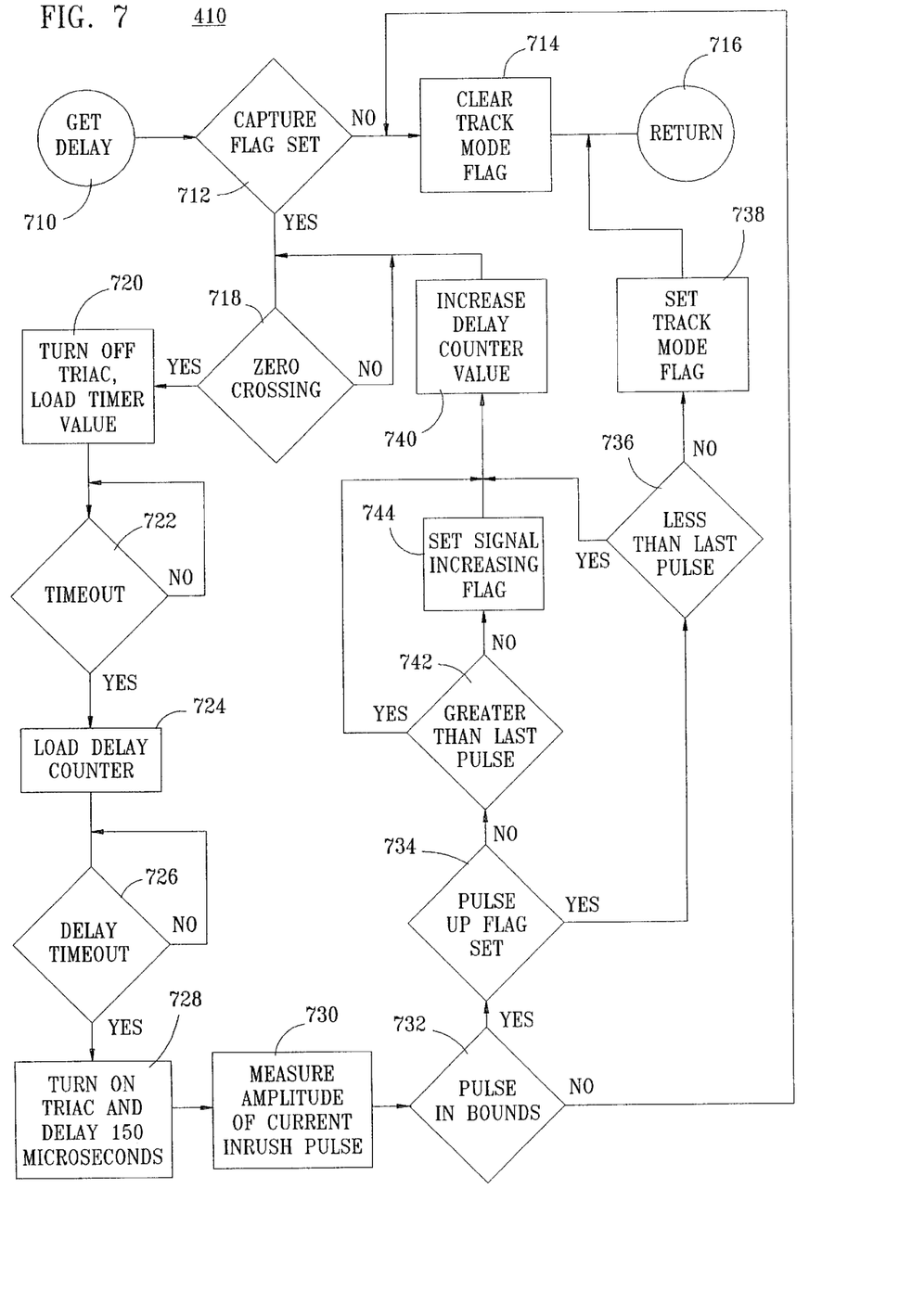
FIG. 7 is a flow chart illustrating in greater detail the timing reference sequence of FIG. 4.

Referring to FIG. 7 after capture of a pulse from the saturable transformer 30 in the capture flag routine 408, the microprocessor 13 executes the timing reference routine 410 that commences at an initialization step 710. The microprocessor 13 then runs a flag set inquiry 712 to determine if the capture flag has been set. When the capture flag has not been set, the timing reference routine 410 advances to a mode flag routine 714 to clear the track mode flag. Following the mode flag routine 714, the timing reference routine 410 advances to a return step 716.

When a capture flag has been set, it is identified by the flag set inquiry 712, and the timing reference routine 410 advances to a zero crossing inquiry 718 to identify if a zero crossing has been detected. When the zero crossing inquiry 718 identifies that no zero crossing has occurred the routine recycles through the zero crossing inquiry until the occurrence of a zero crossing has been identified. With the identification of a zero crossing, the timing reference routine 410 advances to a Triac/timer routine 720 to turn off the Triac 45 and load the timer value to memory. The timing reference routine of FIG. 7 then advances to a time-out inquiry 722 and recycles through this inquiry until a time-out has been identified. When a time-out has been identified by the time-out inquiry 722, the timer reference routine 410 advances to load a delay counter of the microprocessor 13 in a load routine 724. Following completion of the load routine 724, the timer reference routine for determining a timing reference value advances to a delay inquiry 726 and recycles through this inquiry until a delay time-out is identified. The microprocessor 13 then advances the timing reference routine to a turn-on sequence 728 that turns on the Triac 45 and implements a delay of 150 μsec. Next, after turning on the Triac 45, the microprocessor 13 measures the amplitude of the inrush current pulse in an inrush routine 730. The routine timer reference 410 then advances to a pulse bound inquiry 732 to determine if the measured current amplitude is within bounds. When the measured current is within bounds, the timer reference routine 410 advances back to the mode flag routine 714 to clear the track mode flag. If the measured amplitude of the inrush current pulse is within bounds, the routine of FIG. 7 advances to a flag set inquiry 734 to determine if a pulse-up flag has been set. With the identification of the pulse-up flag, the timer reference routine 410 advances to a less than last pulse inquiry 736 to evaluate if the present measured pulse current is more or less than the previous pulse current. If the present pulse current is not less than the previous pulse current, the routine of FIG. 7 advances to a mode flag routine 738 to set the track mode flag and advance the timer reference routine 410 to the return 716.

When the present pulse current is less than the measured value of the previous pulse current, the microprocessor 13 advances from the last pulse inquiry 736 to a counter value routine 740 to increase the delay counter value and return the sequence to the zero crossing inquiry 718.

Returning to the flag set inquiry 734, when the pulse flag has not been set the inquiry advances the routine to a greater than last pulse inquiry 742 to determine if the present pulse amplitude is greater than the previous pulse amplitude. When the present pulse amplitude is greater than the previous pulse amplitude, the timer reference sequence 410 advances to an increasing flag routine 744 to set a signal increasing flag and then advance the routine to the counter value routine 740 and return to the zero crossing inquiry 718

When the amplitude of the present pulse is greater than the previous pulse as determined at the last pulse inquiry 742, the microprocessor 13 advances the sequence to the counter value sequence 740 and return to the zero crossing inquiry 718.

Figure 8:
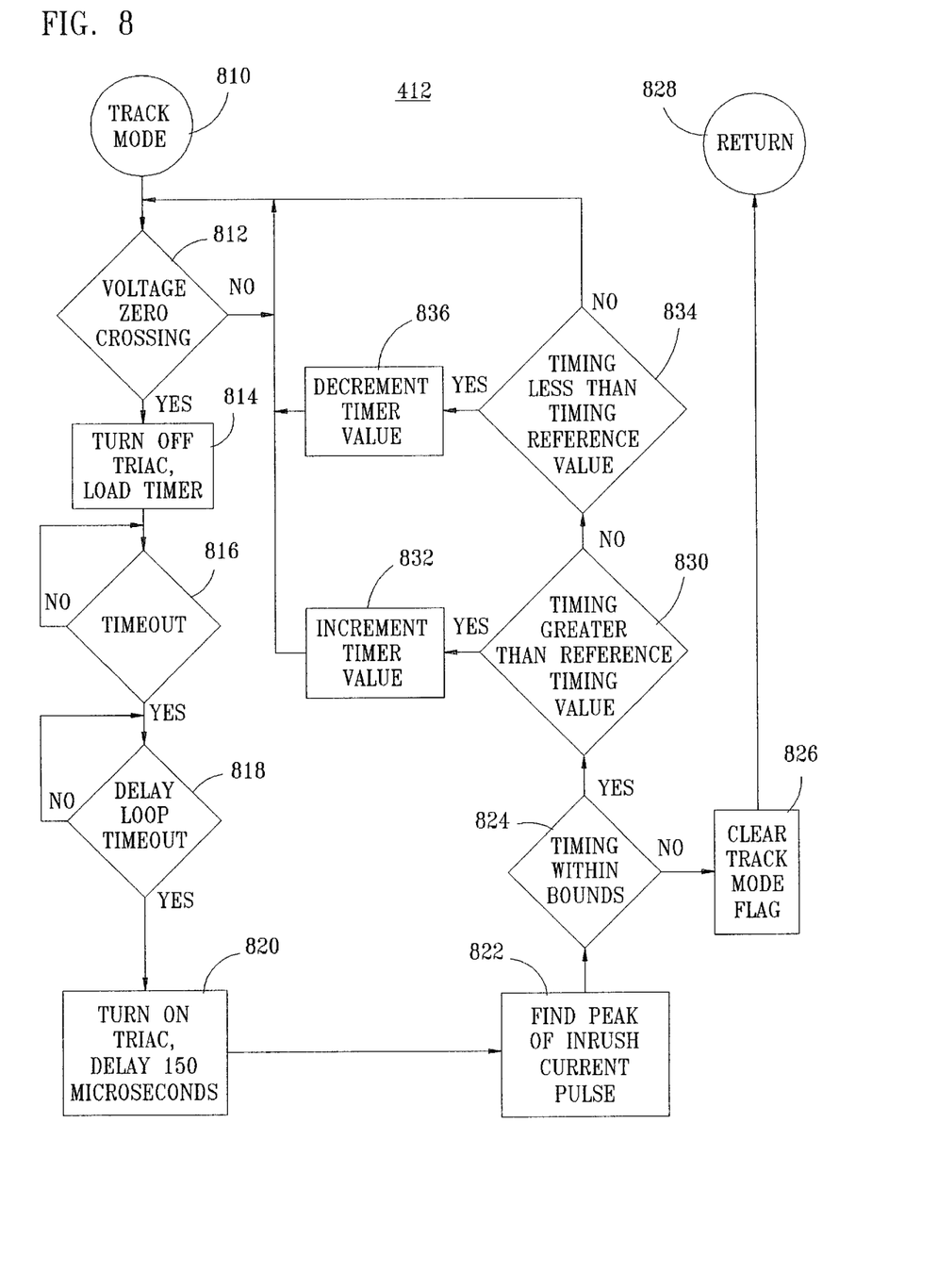
FIG. 8 is a flow chart illustrating in greater detail the track pulse routine of FIG. 4.

Referring to FIG. 8, following completion of the timing reference routine 410, the microprocessor 13 advances to the track pulse routine 412 and enters this routine at a track mode routine 810. Upon entering the track pulse routine, a zero crossing inquiry 812 is called to determine if there have been any voltage zero crossings in the monitored pulse train. The zero crossing inquiry 812 circulates until a zero crossing has been identified and the track pulse routine advances to a Triac/timer routine 814 that turns off the Triac 45 and loads a timer internal to the microprocessor 13. Upon completion of the Triac/timer routine 814, the track pulse routine advances to a time-out inquiry 816 and this inquiry recycles until a time-out has occurred advancing the routine to a loop time-out inquiry 818. The loop time-out inquiry 818 also recycles until a loop time-out has occurred and the routine advances to a turn-on to a Triac/delay routine 820 that turns on the Triac 45 and activates a delay of 150 μsec. On completion of the Triac/delay routine 820, the microprocessor 13 advances to a current pulse routine 822 to identify the peak of an inrush current pulse. Next, the routine of FIG. 8 advances to a within bounds inquiry 824 to evaluate when the pulse timing is within bounds. When the timing is not within the set bounds, the track pulse routine 412 advances to a mode flag routine 826 that clears the track mode flag and the routine advances to return 828.

When the pulse timing is within bounds, the within bounds inquiry 824 advances the track pulse routine 412 to a timing value inquiry 830. If the pulse timing is greater than the reference timing value from the timing reference routine 410 of FIG. 7, the microprocessor 13 runs a timer value routine 832 and upon completion of this routine, the routine of FIG. 8 returns to the zero crossing inquiry 812.

If the timing of pulses is not greater than the reference timing value from the timing reference routine 410, then the track pulse routine 412 advances to a reference value inquiry 834 to determine if the pulse timing is the less than the value set by the timing reference routine 410. If the measured timing is not less than the reference value, the track pulse routine 412 returns to the zero crossing inquiry 812. If the measured timing is less than the reference value, the microprocessor 13 runs a timer value routine 836 to decrement the timer value and return the track pulse routine 412 to the zero crossing inquiry 812.

Operationally, the microprocessor 13 runs the program of FIG. 4 following each of the routines to optimize operation of the induction motor 42. Various routines of FIGS. 5–8 are run as required as part of the control system 43 to optimize operation of the induction motor 42.

The input voltage waveform, protected by a current limiting resistor 35 and modified by a diode 36 and a zener diode 37 limiter, is also introduced to the microprocessor. The diode 36 shunts the negative excursion of the input waveform. The zener diode 37 clamps the positive excursion at five volts. The result is a square wave, the edges of which are used by the microprocessor 13 to determine the voltage zero crossing, which serves as the reference from which all timing measurements are made.

Under brownout or low input voltage conditions, existing devices simply shut down the motor if the voltage drops below a pre-programmed level. The control system of the current invention is not dependent on a programmed voltage. If the device is operating at full power and then cannot maintain the correct timing between the Triac firing angle and the inrush current pulse due to a decrease in the input voltage, an overload condition will be sensed. The overload could be due to low input voltage (e.g., a brownout) or to a mechanical overload. In either instance, if the condition persists for a programmed length of time, the motor will be shut down. If the reason for shut-down was low input voltage, the microprocessor will restart the motor as soon as the under-voltage is corrected. If the reason is a mechanical problem, then the system must be manually re-started.

The microprocessor 13 has a clock frequency maintained by an external crystal 38. There are also two light-emitting diodes 39 and 40 which display the status of the microprocessor. One displays the presence of an inductive load, and the other indicates when the circuit is tuned to optimum efficiency. The Triac is isolated from the microprocessor by the use of an optically-coupled firing circuit 41.

The power for the microprocessor is provided by a DC power supply 14 which is capacitively coupled to the source voltage.

Whereas the present invention has been described in relation to the drawings attached hereto, it should be understood that other and further modifications, apart from those shown or suggested herein, may be made within the spirit and scope of this invention.

We claim:

1. Apparatus for controlling the operation of an AC induction motor, comprising:

switching means for switching AC voltage to the induction motor between a turn on state and a turn off state;

means for sensing the amplitude of inrush current to the induction motor following a voltage zero crossing of the AC voltage applied to the induction motor;

a controller including means for sensing the amplitude of the inrush current as a function of time delay between a voltage zero crossing and the turn on of said switching means, and further including means for sensing a decrease in the amplitude of the inrush current following a peak in the inrush current amplitude, said controller including means for measuring the time interval between the turn on of said switching means and the time of sensing of said decrease in the amplitude of the inrush current to generate a control signal; and means responsive to the control signal for controlling the turn on of said switching means for each successive half cycle of the AC voltage applied to the induction motor following a voltage zero crossing.

2. Apparatus for controlling the operation of an AC induction motor as set forth in claim 1 wherein said means for sensing comprises a saturable core transformer connected in series with the AC induction motor.

3. Apparatus for controlling the operation of an AC induction motor as set forth in claim 2 wherein said means for sensing further includes a demodulator responsive to the output of the saturable core transformer and providing a demodulated value of the inrush current to said controller.

4. Apparatus for controlling the operation of an AC induction motor as set forth in claim 1 wherein said switching means comprises a Triac connected in series with the AC induction motor.

5. Apparatus for controlling the operation of an AC induction motor, comprising:

a semiconductor switch for switching AC voltage to the induction motor between a turn on state and a turn off state;

a saturable core transformer responsive to the amplitude of inrush current to the induction motor resulting from the application of the AC voltage to the induction motor;

a controller including means for sensing the amplitude of the inrush current as a function of time delay between a voltage zero crossing and the turn on of said semiconductor switch, and means for sensing a decrease in the amplitude of the inrush current following a peak in the inrush current amplitude, said controller including means for measuring the time interval between the turn on of the semiconductor switch and the time of sensing of the decrease in the amplitude of the inrush current and generating in response thereto a control signal; and means for controlling said semiconductor switch between the turn on state and the turn off state in response to the generated control signal.

6. Apparatus for controlling the operation of an AC induction motor as set forth in claim 5 wherein said semiconductor switch comprises a Triac.

* * * * *